(12) United States Patent
Lin et al.

(10) Patent No.: US 12,552,203 B2
(45) Date of Patent: Feb. 17, 2026

(54) STRUCTURE FOR ENHANCING SIDEWALL MARKING CONTRAST AND TIRE WITH THE SAME

(71) Applicant: CHENG SHIN RUBBER IND. CO., LTD., Changhua County (TW)

(72) Inventors: Min-Chi Lin, Changhua County (TW); Yu-Hao Hsu, Changhua County (TW); Chang-Chih Chang, Changhua County (TW); Thi Kim Chi Duong, Changhua County (TW)

(73) Assignee: Cheng Shin Rubber Ind. Co., Ltd., Changhua County (TW)

( * ) Notice: Subject to any disclaimer, the term of this patent is extended or adjusted under 35 U.S.C. 154(b) by 182 days.

(21) Appl. No.: 18/366,332

(22) Filed: Aug. 7, 2023

(65) Prior Publication Data
US 2024/0051349 A1 Feb. 15, 2024

(30) Foreign Application Priority Data
Aug. 9, 2022 (TW) .................................. 111129923

(51) Int. Cl.
*B60C 13/00* (2006.01)
*B60C 13/02* (2006.01)

(52) U.S. Cl.
CPC ............ *B60C 13/001* (2013.01); *B60C 13/02* (2013.01)

(58) Field of Classification Search
CPC ........ B60C 13/00; B60C 13/001; B60C 13/02
See application file for complete search history.

(56) References Cited

U.S. PATENT DOCUMENTS

2012/0227879 A1 9/2012 Muhlhoff et al.

FOREIGN PATENT DOCUMENTS

| CN | 101249780 A | 8/2008 |
| CN | 107709051 A | 2/2018 |
| CN | 111775634 A | 10/2020 |
| CN | 112428752 A | 3/2021 |
| WO | 2021261553 A1 | 12/2021 |
| WO | 2022014474 A1 | 1/2022 |

*Primary Examiner* — Justin R Fischer
(74) *Attorney, Agent, or Firm* — Rosenberg, Klein & Lee

(57) ABSTRACT

A structure for enhancing sidewall marking contrast and tire with the same are disclosed. The structure includes a plurality of structural units each having at least three quadrilaterals extending outward radiatively from a center thereof so that the structural unit form a code on a sidewall of a tire. The structure enhances sidewall marking contrast and increase observability of the code against the sidewall, thereby helping impress consumers with accentuated product distinctiveness and/or brand image.

12 Claims, 15 Drawing Sheets

STRUCTURE FOR ENHANCING SIDEWALL MARKING CONTRAST AND TIRE WITH THE SAME

BACKGROUND OF THE INVENTION

1. Technical Field

The present invention relates to a structure and a tire with the same, and more particularly to a structure for enhancing sidewall marking contrast and a tire with the same.

2. Description of Related Art

Branded tires generally have their sidewalls carved or printed with product information like specifications, rotation direction, and recommend pressure along with patterns or graphic features that distinguish their makers or vendors.

To ensure good observability of these information, patterns and graphic features against sidewalls, there have been solutions that use fine structures to create rough regions on smooth sidewall surfaces thereby enhancing visual contrast therebetween.

For example, China Patent Publication No. CN111775634A has provided a honeycomb grain suede-touch structure on the surface of a tire, which is formed by arranging N columnar cavity structures in a continuous array manner, wherein N is a natural number which is more than or equal to 1. The area of the upper bottom surface of each columnar cavity structure is larger than that of the lower bottom surface. The design of the tire grain is implemented with high-precision equipment to create tiny honeycomb textures that eventually form a honeycomb grain suede surface on the resulting vulcanized tire to present a novel, reflection-based color-changing appearance. The fine suede effect so produced is claimed to ensure structural strength and esthetic appearance of the tire.

In addition, China Patent Publication No. CN112428752A has provided a Y-textured suede-touch structure of a tire sidewall, which is formed by arranging N structurally identical Y-shaped bodies into an array. The three components of the Y-shaped body are structurally identical, and each two of the components are separated by an included angle of 120 degrees. The sides of the Y-shaped bodies are composed of two structurally identical trapezoidal bodies, each of which is an isosceles trapezoidal body, and triangular embedded blocks are integrally formed in gaps between the sides of three adjacent Y-shaped bodies. The structure is formed using laser machining to absorb light so as to be presented as a suede-touch area and visually accentuated against the sidewall, thereby improving quality and aesthetics of the resulting tire.

The present invention is hence focused on improving marking contrast on sidewalls of tires and thereby providing a novel solution superior to the prior-art schemes.

SUMMARY OF THE INVENTION

To this end, the present invention provides a structure for enhancing sidewall marking contrast, which is to be formed on a sidewall of a tire body. The structure for enhancing sidewall marking contrast comprises: a plurality of structural units, arranged abreast on the sidewall, each of the structural units having a center from which at least three quadrilaterals extending outward radiatively, each of the quadrilaterals having four edges; in each of the structural units, each of the quadrilaterals bordering each of its adjacent quadrilaterals with a common said edge; and the structural units jointly forming a code on the sidewall; wherein an imaginary reference line perpendicular to the axial direction is defined, so that when the reference line shifts and passes through at least the three edges of one of the structural units, the reference line intersects the edges at three or more intersection points, and at least two different spacing scales exist among the intersection points.

Further, each of the edges in each of the structural units has a top and a bottom opposite to each other, wherein the top defines a top width, and the bottom defines a bottom width. The top width ranges between 0.02 and 0.2 mm, and the bottom width ranges between 0.02 and 0.2 mm.

Therein, the top width is not greater than the bottom width.

Furthermore, each of the edges in each of the structural units has a top and a bottom opposite to each other, wherein a height of the edge measured between the top and the bottom ranges between 0.2 and 1.5 mm.

Furthermore, each of the edges in each of the structural units has a slope connecting between the top and the bottom, and a rough region takes up at least one fourth of a total surface area of the slope, wherein the rough region has an average roughness ranging between 5 and 30 µm.

Therein, in each of the structural units, a number of the quadrilaterals ranges between three and eight.

Therein, the structural unit has a maximum length ranging between 0.2 and 1.5 mm.

Therein, a number of the structural units in every square millimeter of a surface of the sidewall ranges between 8 and 84.

Therein, on the sidewall, the adjacent structural units border each other with the common edge therebetween.

Therein, the structural unit are arranged into an aligned array, or into a staggered array.

Therein, at least two different spacing scales exist among the at least three intersection point formed among the reference line and the edges, which means that an interval is formed between each two of the at least three intersection points, and at least one of the intervals is different from the other intervals in size.

Therein, the quadrilaterals bordering each other with the common edge therebetween are not congruous.

The present invention further provides a tire with enhanced sidewall marking contrast, which comprises the structure for enhancing sidewall marking contrast as described previously, and further comprises a tire body that has a sidewall.

With the technical features described previously, the present invention achieves the following desirable effects:

1. With properly designed dimensions and arrangements, the structural units have enhanced visual contract and observability against the sidewall, thereby helping impress consumers with accentuated product distinctiveness and/or brand image.

2. With the properly designed dimensions, the structural unit helps prevent the mold from damage during mold washing, and has good processability, while ensuring good sidewall marking contrast.

DETAILED DESCRIPTION OF THE INVENTION

For further illustrating the means and functions by which the present invention achieves the certain objectives, the following description, in conjunction with the accompanying drawings and preferred embodiments, is set forth as below to illustrate the implement, structure, features and effects of the subject matter of the present invention.

FIG. 1 through FIG. 4 depict a structure for enhancing sidewall marking contrast and a tire with the same according to a first embodiment of the present invention. The disclosed structure comprises a plurality of structural units 1.

The structural units 1 are arranged abreast on a sidewall 2 of a tire body. The structural units 1 may be arranged into an aligned array, or into a staggered array. In the depicted embodiment, they are arranged into a staggered array. In order not to obscure the focus of the present invention, namely the structural units 1, the tire body as a conventional article is not is shown partially.

Figure 1:
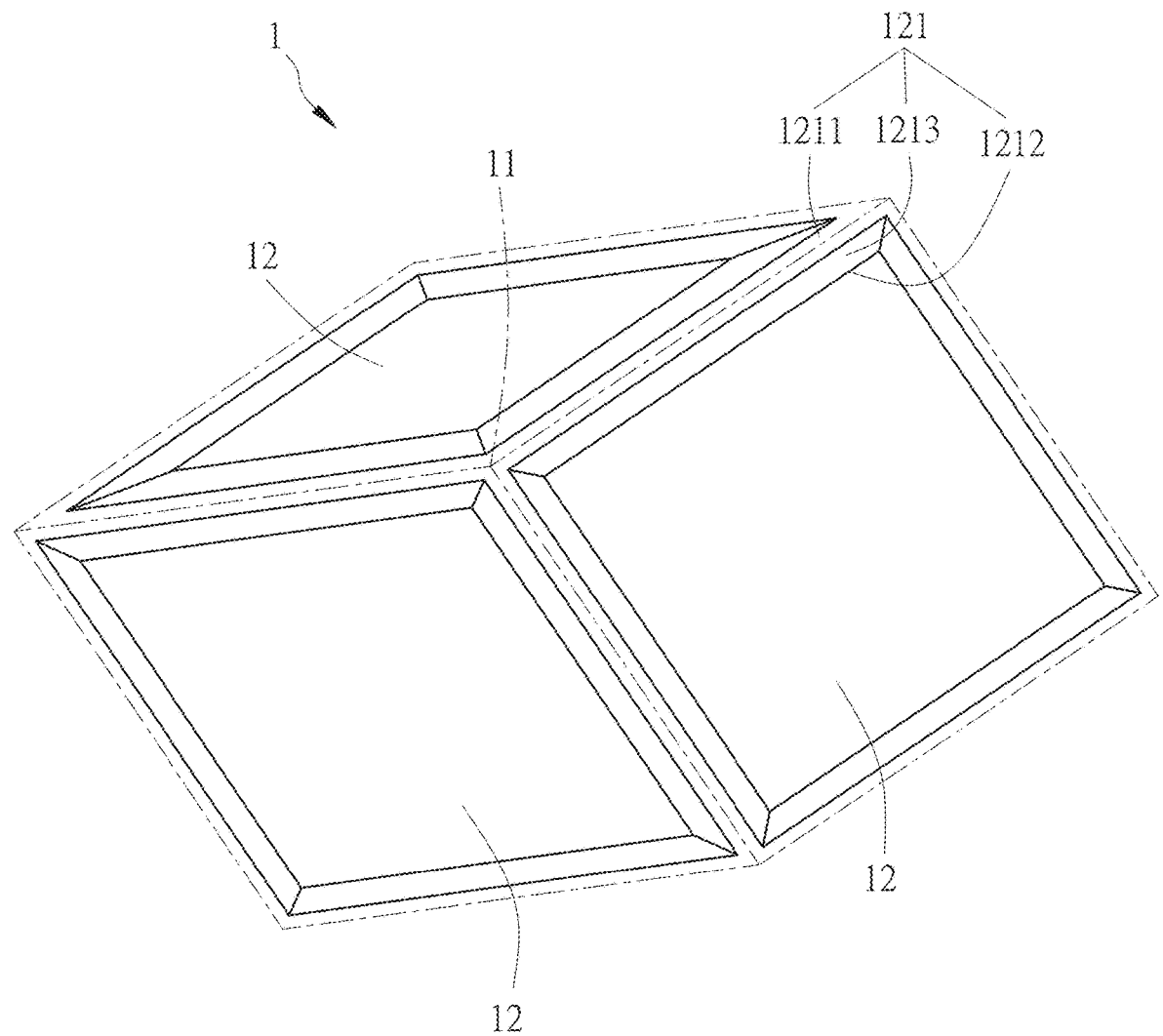
FIG. 1 schematically depicts a single structural unit according to a first embodiment of the present invention.
Figure 3:
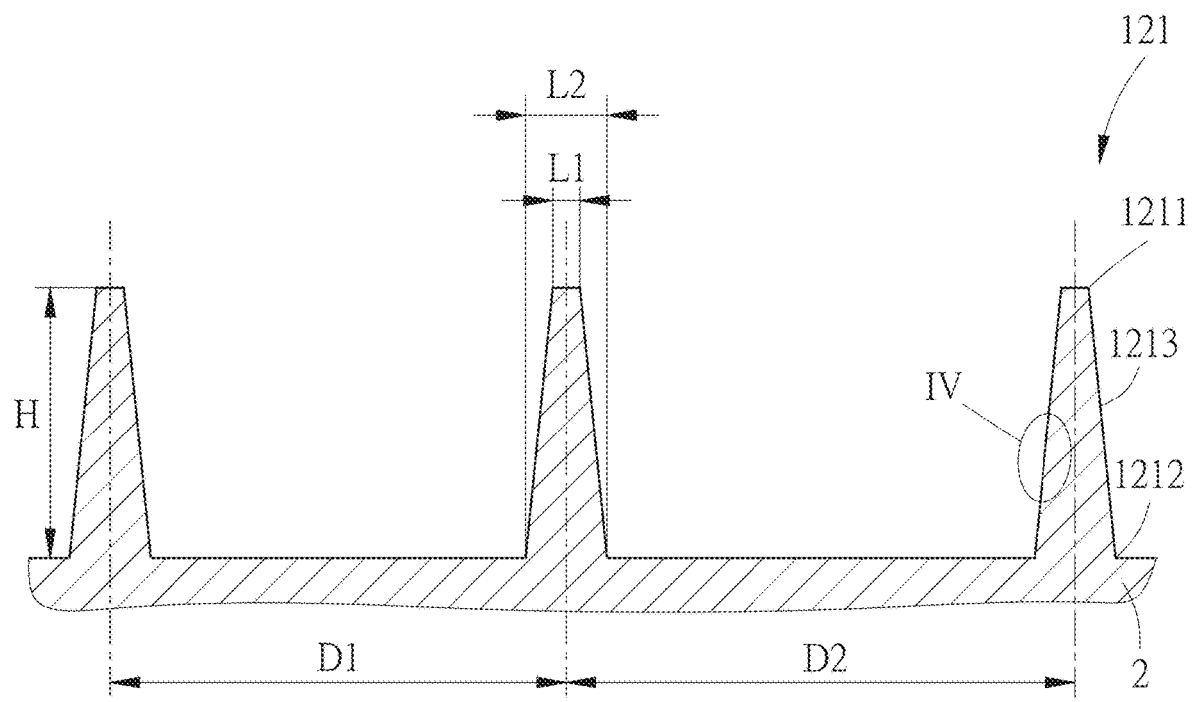
FIG. 3 is a partial, cross-sectional view of FIG. 2.

It is to be noted first that FIG. 1 shows the disclosed structure observed in the direction parallel to the axial direction of the tire body, and FIG. 3 shows the disclosed structure observed in the direction perpendicular to the axial direction of the tire body.

As shown in FIG. 1, each of the structural units 1 has a center 11 from which at least three quadrilaterals 12 extend outward radiatively. Each of the quadrilaterals 12 is defined by four edges 121 and has a closed central region fenced by the four edges 121. In each of the quadrilaterals 12, each of the edges 121 is higher than the central region in altitude.

In each of the structural units 1, the number of the quadrilaterals 12 may range between three and eight. In the present embodiment, there are three quadrilaterals 12 in a structural unit 1.

In each of the structural units 1, each of the quadrilaterals 12 borders each of its neighbors with a common said edge 121, and the quadrilaterals 12 sharing a common edge 121 are not geometrically congruous.

On the sidewall 2, the number of the structural units 1 in every square millimeter ranges between 8 and 84. Each of the structural units 1 borders each of its neighbors with a common said edge.

Figure 2:
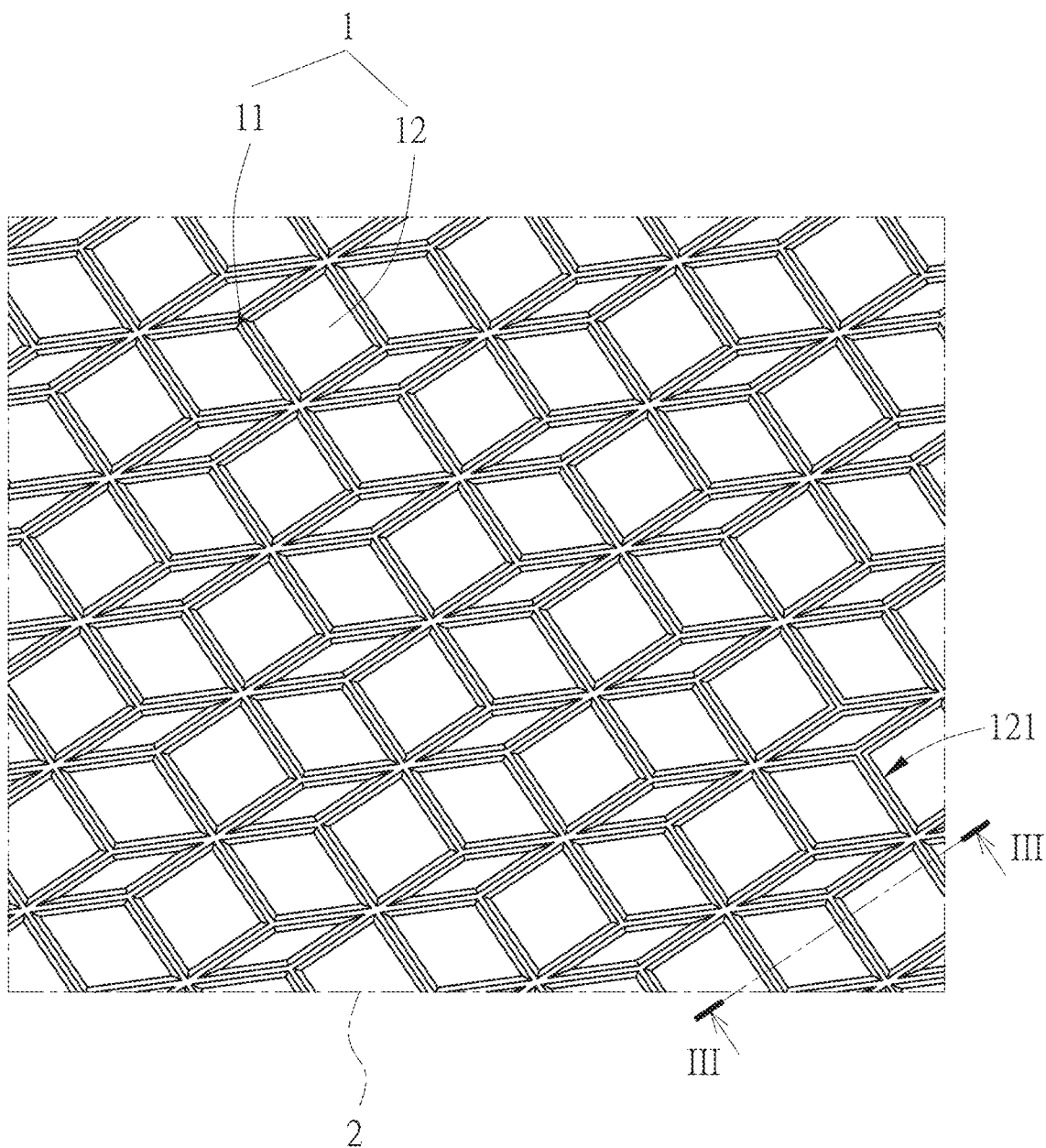
FIG. 2 is a schematic drawing showing plural structural units of the first embodiment of the present invention arranged on a sidewall of a tire.

An imaginary reference line perpendicular to the axial direction is defined, so that when the reference line shifts and passes through at least three edges 121 of any structural unit 1, the reference line intersects the edges 121 at three or more intersection points, and at least two different spacing scales exist among the intersection points, as shown in the cross-sectional view taken along Line III-III in FIG. 2.

Taking a case where there are three intersection points for example, each two adjacent intersection points form an interval D1 or D2. The intervals D1, D2 are each measured from the central line of one edge 121 to the central line of the next edge 121, wherein one interval D1 is not equal to the other interval D2 in size.

As the reference line is continuously shift to pass it through at least three edges 121 of one structural unit 1, the sizes of the resulting intervals D1, D2 may be different although such a case is not shown in the drawings.

Figure 4:
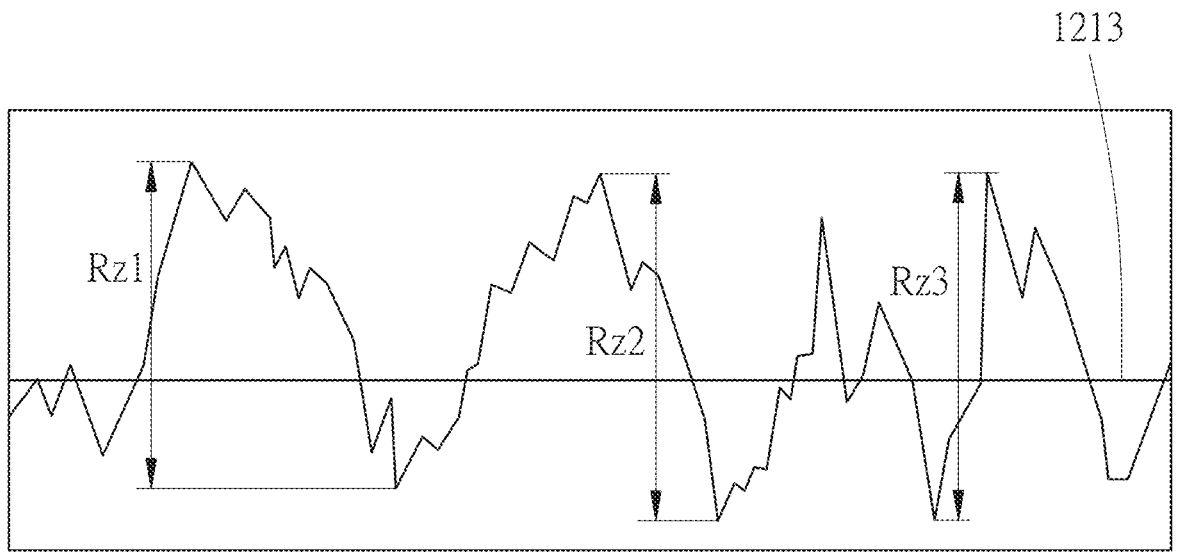
FIG. 4 graphically represents roughness profile of FIG. 3.
Figure 5:
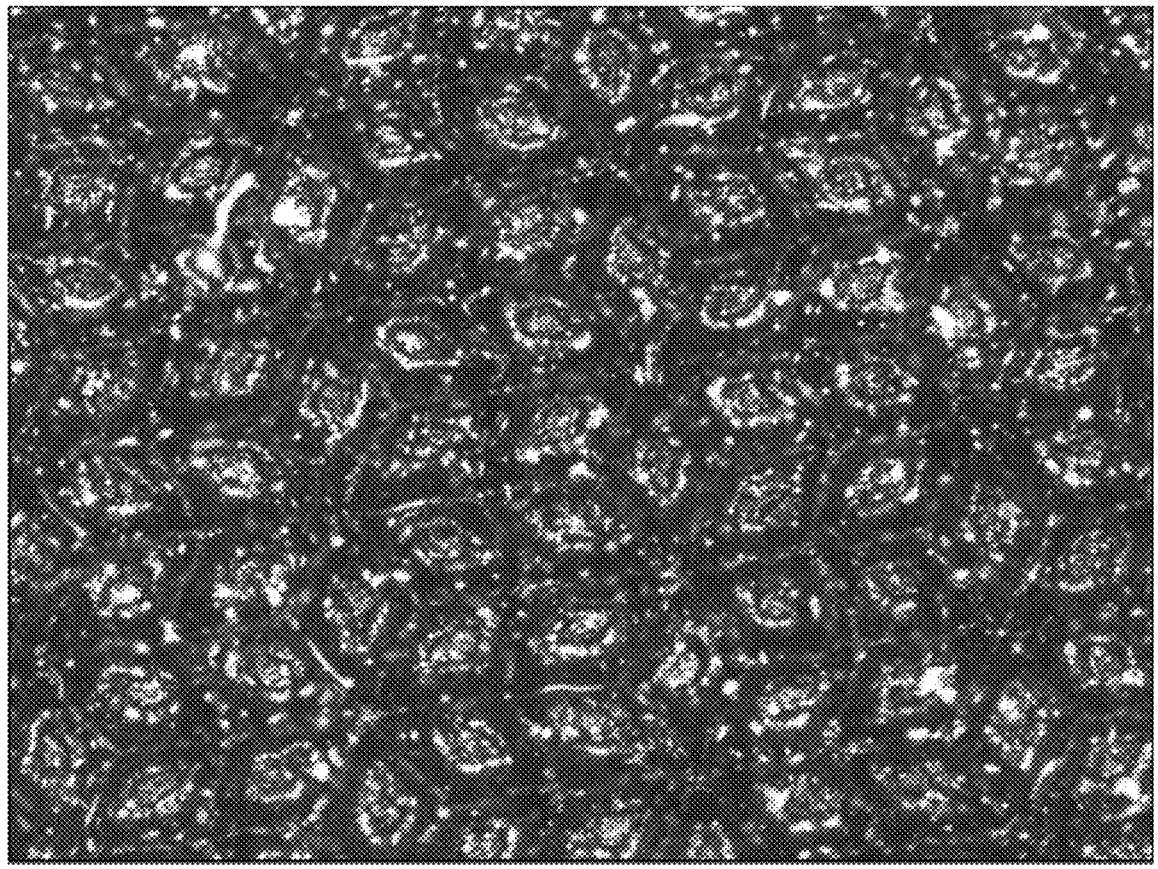
FIG. 5 is a photomicrograph of the structural unit of the first embodiment of the present invention.
Figure 6:
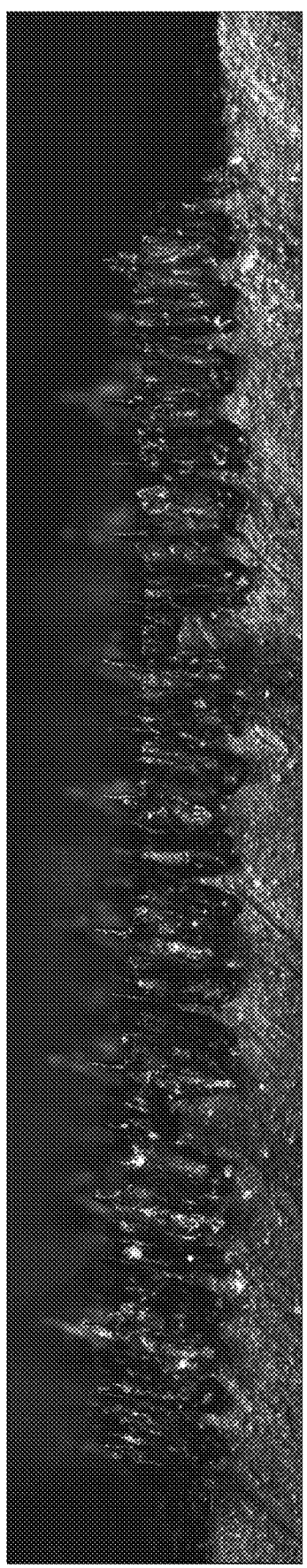
FIG. 6 is another photomicrograph of the structural unit of the first embodiment of the present invention.
Figure 7:
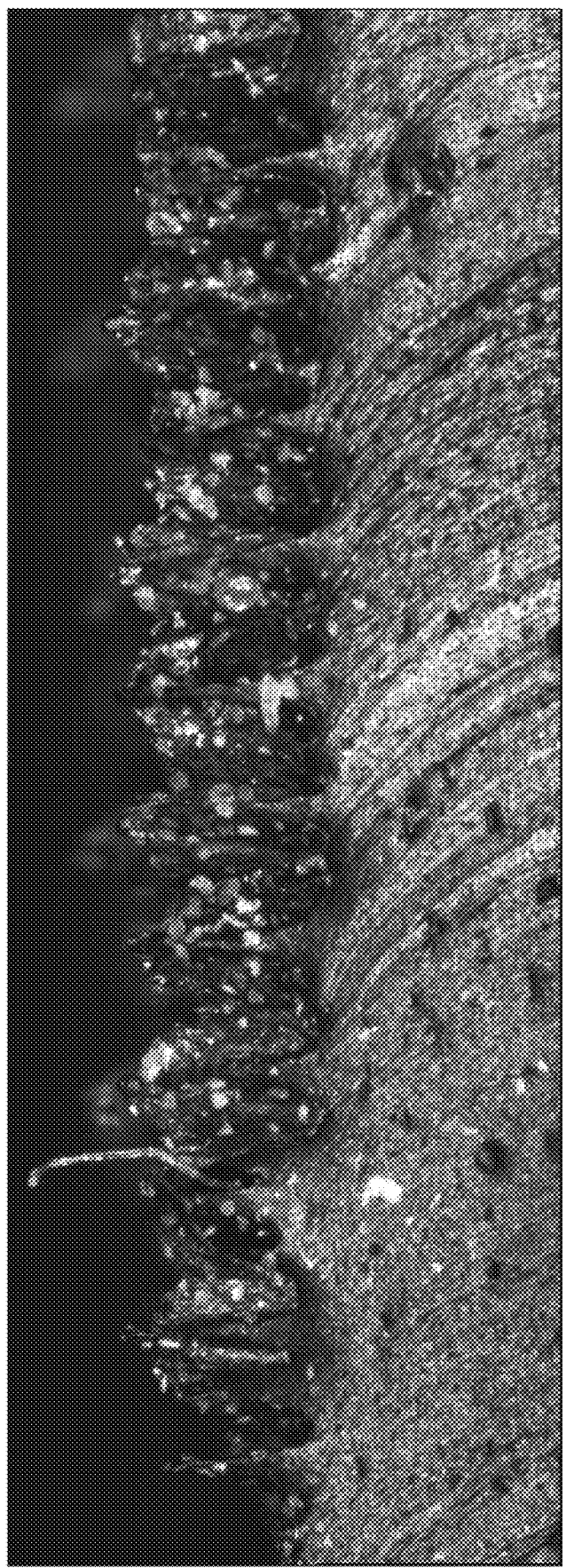
FIG. 7 is still another photomicrograph of the structural unit of the first embodiment of the present invention.

When being observed in the direction perpendicular to the axial direction, each of the edges 121 in each of the structural units 1 has a top 1211 and a bottom 1212 that are opposite to each other. The bottom 1212 coincides with the sidewall 2. Each of the edges 121 in each of the structural units 1 has a slope 1213 connecting between the top 1211 and the bottom 1212. A rough region takes up at least one fourth of the total surface area of the slope 1213, and there are plural bulges and plural indents formed in the rough region so that the average roughness ranges between 5 and 30 μm. Particularly, the roughness is measured by using the smooth contour line of the slope 1213 that directly connects the top 1211 and the bottom 1212 as the baseline. To be more specific, the roughness is calculated as the average magnitude by which the bulge or the indent raises or sinks from the smooth contour line, whichever is greater. Then plural magnitude values so obtained as roughness values Rz1, Rz2, and Rz3 are averaged to yield the average roughness. In FIG. 4, the reference sign 1213 of the slope 1213 is directly placed on a smooth contour line to indicate that FIG. 4 is a zoom-in view of the slope 1213. In FIG. 1 and FIG. 3, the slope 1213 is simply drawn as a smooth contour line with the bulges and the indents omitted.

The top 1211 defines a top width L1, and the bottom 1212 defines a bottom width L2. The top width L1 is not greater than the bottom width L2. The top width L1 ranges between 0.02 and 0.2 mm, and the bottom width L2 ranges between 0.02 and 0.2 mm. A height H is defined between the top 1211 and bottom 1212. The height H ranges between 0.2 and 1.5 mm.

The structural unit 1 has a maximum length, which ranges between 0.2 and 1.5 mm. The maximum length is herein defined as the maximum distance from one vertex to another vertex in the same structural unit 1.

Figure 11:
FIG. 11 is an applied view of the first embodiment of the present invention, wherein the structural units form a code on a sidewall of a tire.

The structural unit 1 may have a code A provided on the sidewall 2, as shown in FIG. 11. The code A may be a word, a symbol, a pattern, or the like, without limitation.

Referring to FIG. 5 through FIG. 7, and FIG. 2 as well, as shown clearly in the photomicrographs of the structural units 1, the structural units 1 when being assembled do have the densely arranged structure as depicted in FIG. 2.

Figure 8:
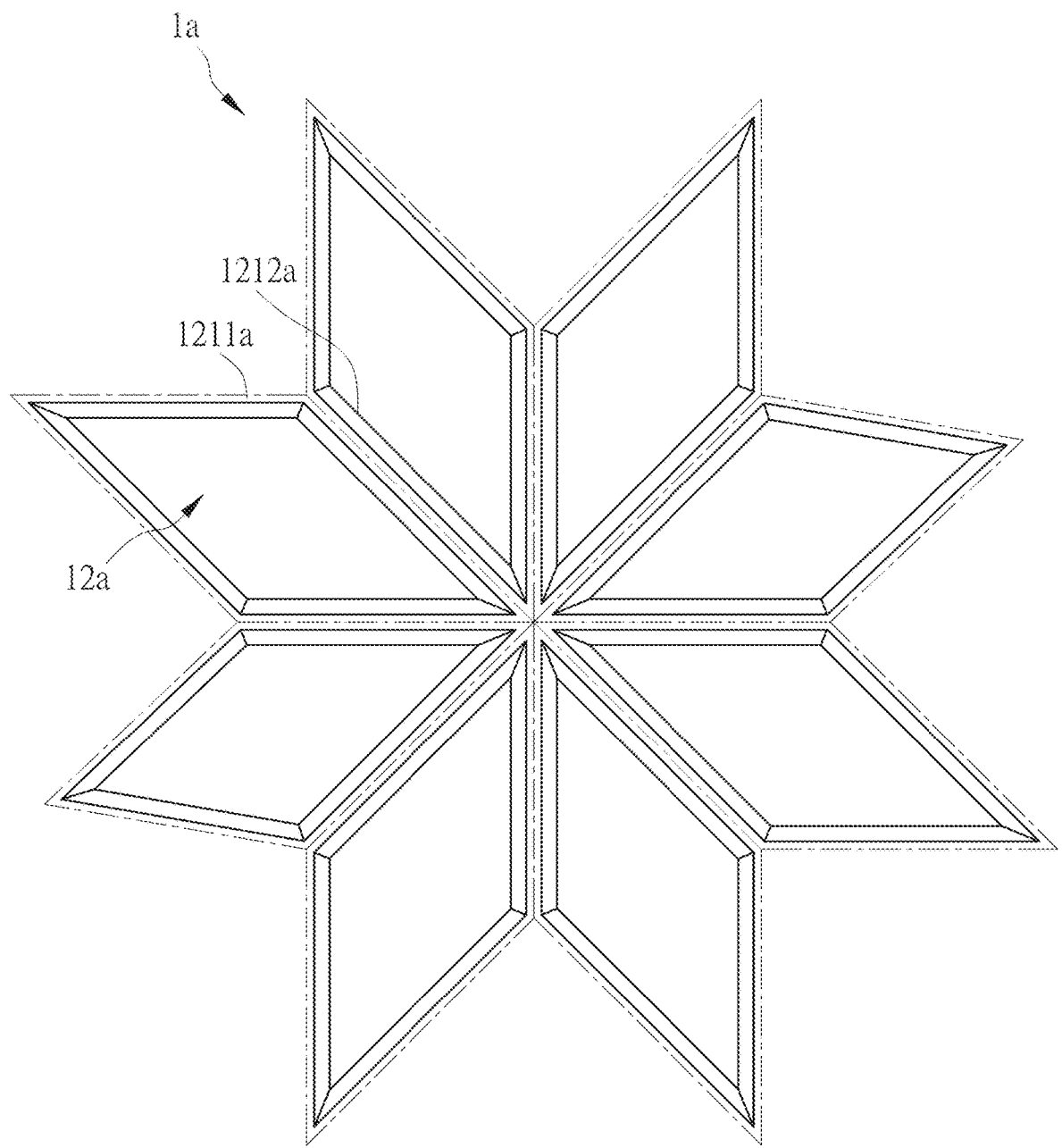
FIG. 8 schematically depicts a single structural unit according to a second embodiment of the present invention.
Figure 9:
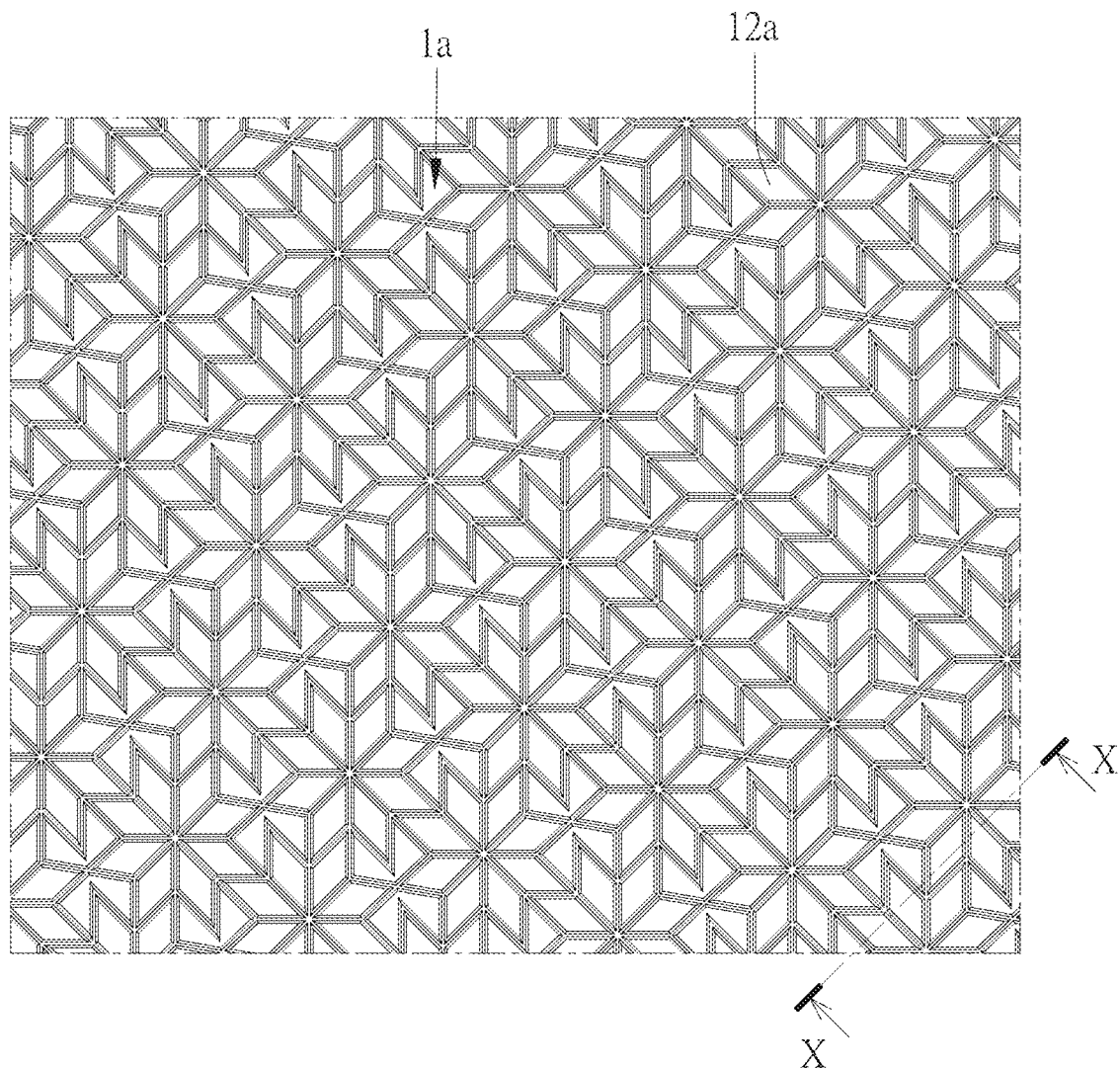
FIG. 9 is a schematic drawing showing plural structural units of the second embodiment of the present invention arranged on a sidewall of a tire.
Figure 10:
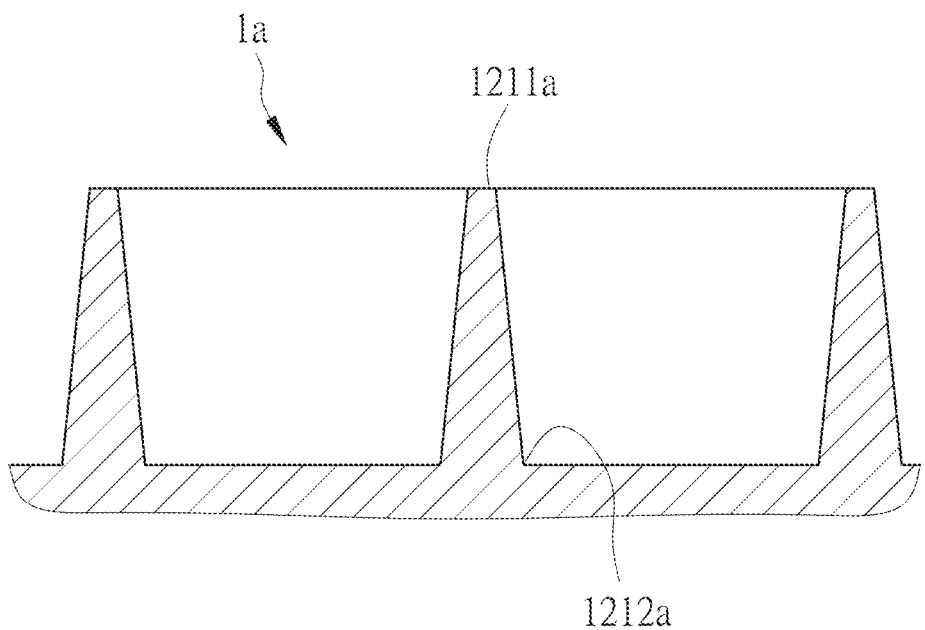
FIG. 10 is a partial, cross-sectional view of FIG. 9.

Referring to FIG. 8 through FIG. 10 depict a structure for enhancing sidewall marking contrast and a tire with the structure according to second embodiment of the present invention. The present embodiment is similar to the first embodiment except that: the present embodiment has eight quadrilaterals 12a instead of the three quadrilateral 12 of Embodiment 1, as shown in FIG. 2.

Similar to Embodiment 1, the array of the structural units 1a effectively enhances marking contrast. Other structural features or configurations, such as having the top width L1 not greater than the bottom width L2 (not shown in drawings of the present embodiment) may be identical to their counterparts in Embodiment 1, and thus are not repeatedly described herein.

Referring to FIG. 1 and FIG. 11, a preferred embodiment of a tire with enhanced sidewall marking contrast according to the present invention may be a tire having the structure for enhancing sidewall marking contrast of Embodiment 1, wherein the code A may be a vendor of the tire. In the present embodiment, the code A is directly formed by strategically arranged structural units 1. Alternatively, the code A may be presented as a rectangular figure or an area formed any other closed shape defined by flat or curved edges of the structural units 1.

According to the present invention, the tire with enhanced sidewall marking contrast is a tire body carrying the foregoing structure for enhancing sidewall marking contrast.

Figure 12:
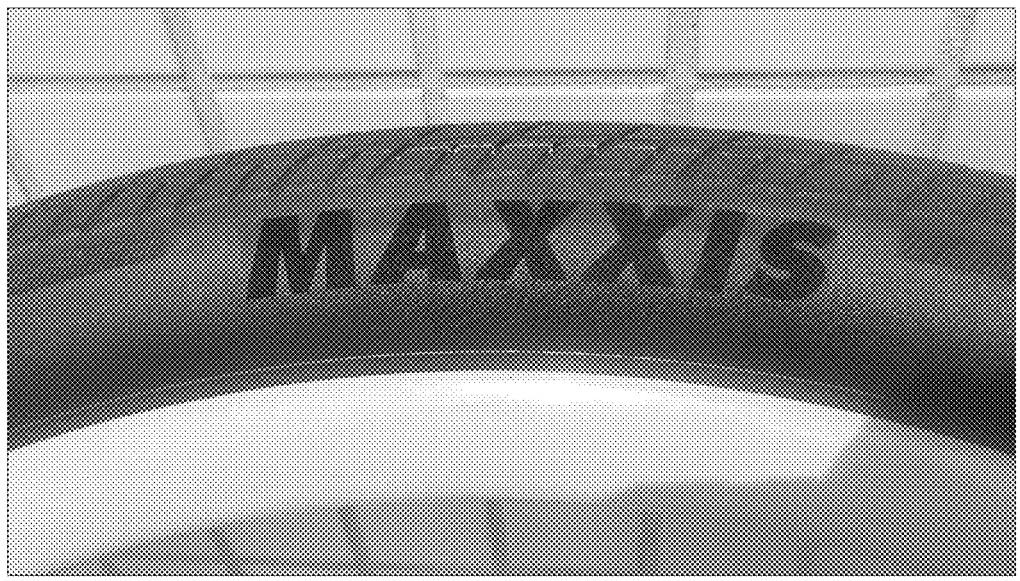
FIG. 12 is similar to FIG. 11, showing that the code remains highly observable against the sidewall under direct illumination.
Figure 13:
FIG. 13 is similar to FIG. 11, showing that the code remains highly observable when being viewed obliquely.

As demonstrated in FIG. 11 through FIG. 13, the code A is highly observable, meaning it is satisfyingly readable even under direct sunlight because the contrast between the code A and the sidewall 2 is high enough.

This ability allows the code A to be recognizable whether it is observed in a normal direction or in an off-normal direction.

Referring again to FIG. 1, FIG. 11, FIG. 14, and FIG. 15, with the dimensions and arrangements as described previously, visual contrast between the structural units 1 and the sidewall 2 can be substantively improved, thereby ensuring good observability of the code A against the sidewall 2 and providing good opportunity for a vendor name or brand name represented by the code A, for example, to be more impressive and notable to consumers.

Figure 14:
FIG. 14 is an applied view of the prior art, showing a code formed on a sidewall of a tire.
Figure 15:
FIG. 15 is similar to FIG. 14, showing prior art that the code is less observable against the sidewall under direct illumination.

Opposite to the prior-art solution shown in FIG. 14 and FIG. 15 where the code A' tends to become less observable due to reflection caused by the sidewall 2', the tire with enhanced sidewall marking contrast of the present invention has good marking contrast between the code A and the sidewall 2, thereby ensuring good observability of the code A.

Meanwhile, the structural units 1 have properly selected dimensions, the mold details are large enough to prevent damage during mold washing, and small enough to prevent the code A from being less observable against the sidewall 2 due to vulcanization of the tire body. Thus, the disclosed structural unit 1 is advantageous for helping extend the service life of the mold, having good processability, and ensuring good observability of the code A.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A structure for enhancing sidewall marking contrast, the structure being formed on a sidewall of a tire body, and the structure comprising:
    a plurality of structural units arranged abreast on the sidewall, each of the plurality of structural units having a center from which at least three quadrilaterals extend outward radially, each of the at least three quadrilaterals having four edges that jointly frame a closed central region, wherein in each of the at least three quadrilaterals, each of the four edges is higher than the closed central region in altitude;
    wherein each of the four edges of each of the at least three quadrilaterals of each of the plurality of structural units includes a top and a bottom opposite to each other and a slope connected between the top and the bottom, and a rough region occupying at least one fourth of a total surface area defined by the slope of each of the four edges of each of the at least three quadrilaterals, and the rough region having an average roughness ranging between 5 µm and 30 µm;
    wherein in each of the plurality of structural units, each of the at least three quadrilaterals borders another adjacent each of the at least three quadrilaterals along a common edge of each of the four edges of each of the at least three quadrilaterals of each of the plurality of structural units;
    wherein the plurality of structural units jointly form a code on the sidewall of the tire body; and
    wherein an imaginary reference line perpendicular to an axial direction with respect to the tire body is definable whereby when the reference line shifts and passes through at least three edges of the four edges of each of the at least three quadrilaterals of one of the plurality of structural units, wherein with respect to the four edges of each of the at least three quadrilaterals the imaginary reference line is intersectable at at least three intersection points to thereby define at least two independent spacing scales among the at least three intersection points.

2. The structure of claim 1, wherein with respect to each of the four edges of each of the at least three quadrilaterals of the plurality of structural units the top defines a top width and the bottom defines a bottom width, and wherein the top width ranges between 0.02 mm and 0.2 mm and the bottom width ranges between 0.02 mm and 0.2 mm.

3. The structure of claim 2, wherein the top width is not greater than the bottom width.

4. The structure of claim 1, wherein a height measured between the top and the bottom of each of the four edges of each of the at least three quadrilaterals of the plurality of structural units ranges between 0.2 mm and 1.5 mm.

5. The structure of claim 1, wherein a number of the at least three quadrilaterals of each of the plurality of structural units ranges between three and eight.

6. The structure of claim 1, wherein each of the plurality of structural units has a maximum length ranging between 0.2 mm and 1.5 mm.

7. The structure of claim 1, wherein a number of the plurality of structural units in every square millimeter of a surface of the sidewall of the tire body ranges between 8 and 84.

8. The structure of claim 1, wherein with respect to the sidewall of the tire body, adjacent ones of the plurality of structural units border each other along a common edge of the four edges of each of the at least three quadrilaterals of each of the plurality of structural units.

9. The structure of claim 1, wherein the plurality of structural units are either of arranged into an aligned array or into a staggered array.

10. The structure of claim 1, wherein with respect to the at least two independent spacing scales exist among the at least three intersection points, an interval is definable between each two of the at least three intersection points, and a size of the interval is different from a size of another interval.

11. The structure of claim 1, wherein with respect to each of the at least three quadrilaterals bordering another adjacent each of the at least three quadrilaterals along a common edge of each of the four edges, the common edge is incongruous.

12. A tire with enhanced sidewall marking contrast, the tire including the structure for enhancing sidewall marking contrast of claim 1,
wherein the tire includes the tire body having the sidewall.

* * * * *